United States Patent
Le et al.

(10) Patent No.: US 7,984,284 B2
(45) Date of Patent: Jul. 19, 2011

(54) SPI AUTO-BOOT MODE

(75) Inventors: Anthony Le, San Jose, CA (US);
Jackson Huang, San Jose, CA (US)

(73) Assignee: Spansion LLC, Sunnyvale, CA (US)

( * ) Notice: Subject to any disclaimer, the term of this patent is extended or adjusted under 35 U.S.C. 154(b) by 873 days.

(21) Appl. No.: 11/945,316

(22) Filed: Nov. 27, 2007

(65) Prior Publication Data
US 2009/0138694 A1 May 28, 2009

(51) Int. Cl.
*G06F 9/24* (2006.01)
*G06F 15/177* (2006.01)

(52) U.S. Cl. ............... 713/2; 713/1; 713/100; 719/321; 719/327

(58) Field of Classification Search ............ 713/1, 2, 713/100; 719/321, 327
See application file for complete search history.

(56) References Cited

U.S. PATENT DOCUMENTS

| | | | |
|---|---|---|---|
| 5,293,594 A | 3/1994 | Nojiri et al. | |
| 6,067,267 A | 5/2000 | Lo | |
| 6,385,704 B1 * | 5/2002 | Rao et al. | 711/151 |
| 6,658,553 B1 * | 12/2003 | Ding et al. | 712/210 |
| 7,069,352 B2 * | 6/2006 | Pezzini | 710/33 |
| 2008/0127225 A1 * | 5/2008 | Mullis et al. | 719/321 |

OTHER PUBLICATIONS

U.S. Appl. No. 11/945,292, filed Nov. 27, 2007, Le et al, entire document.
Non-Final Office Action dated Jun. 9, 2010 from U.S. Appl. No. 11/945,292. 9 Pages.
Notice of Allowance Dated Apr. 6, 2011 for U.S. Appl. No. 11/945,292. 20 Pages.
Final Office Action Dated Oct. 29, 2010 for U.S. Appl. No. 11/945,292. 11 Pages.

* cited by examiner

*Primary Examiner* — Chun Cao
*Assistant Examiner* — Michael J Brown
(74) *Attorney, Agent, or Firm* — Eschweiler & Associates, LLC

(57) ABSTRACT

Systems and methods of detecting an auto-boot mode and booting data from a serial peripheral interface to a processor without the need of a read instruction utilizing a serial peripheral interface having an auto-boot mode detector are provided. In one embodiment, a serial peripheral interface comprises a serial processing component configured to serially communicate data between the processor and at least two peripherals, and an auto-boot component operably coupled to the serial processing component, comprising an auto-boot mode detector configured to determine whether a boot mode exists based on detecting whether serial input data is received during a predetermined wait state, and configured to selectively boot data to a start address associated with the processor based on the boot mode determination.

18 Claims, 6 Drawing Sheets

SPI AUTO-BOOT MODE

FIELD OF INVENTION

The present invention relates generally to peripheral interface devices and the like, and in particular, to a system and method of detecting an auto-boot mode and bursting data from a serial peripheral interface in a processor without requiring a read instruction.

BACKGROUND OF THE INVENTION

Many different types and styles of memory exist to store data for computers and similar type systems. For example, random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM) and flash memory are all presently available to accommodate data storage.

Each type of memory has its own particular advantages and disadvantages. For example, DRAM and SRAM allow individual-bits of data to be erased one at a time, but such memory loses its data when power is removed. EEPROM can alternatively be easily erased without extra exterior equipment, but has reduced data storage density, lower speed, and higher cost. EPROM, in contrast, is less expensive and has greater density but lacks ease of erasability.

Flash memory, has become a popular type of memory because it combines the advantages of the high density and low cost of EPROM with the electrical erasability of EEPROM. Flash memory can be rewritten and can hold its contents without power, and thus is nonvolatile. It is used in many portable electronic products, such as cell phones, portable computers, voice recorders, etc. as well as in many larger electronic systems, such as cars, planes, industrial control systems, etc.

Flash memory is generally constructed of many memory cells where, generally, single bits of data are stored in and read from respective memory cells. The cells are generally programmed by hot electron infection and erased by Fowler-Nordheim tunneling or other mechanisms. As with many aspects of the semiconductor industry, there is a continuing desire and effort to achieve higher device packing densities and increase the number of memory cells on a semiconductor wafer. Similarly, increased device speed and performance are also desired to allow more data to be stored on smaller memory devices.

Individual flash memory cells are organized into individually addressable units or groups, which are accessed for read, program, or erase operations through address decoding circuitry. The individual memory cells are typically comprised of a semiconductor structure adapted for storing a bit of data and includes appropriate decoding and group selection circuitry, as well as circuitry to provide voltages to the cells being operated upon.

As with many aspects of the semiconductor industry, there is a continuing desire to scale down device dimensions to achieve higher device packing densities on semiconductor wafers. Similarly, increased device speed and performance are also desired to allow more data to be stored on smaller memory devices. Accordingly, there are ongoing efforts to, among other things, increase the number of memory cells that can be packed on a semiconductor wafer (or die).

For example, another type of flash memory is dual element nitride storage flash memory, which allows multiple bits to be stored in a single cell. In this technology, a memory cell is essentially split into two identical (mirrored) or complementary regions, each of which is formulated for storing one of two independent bits or elements. Each dual element nitride storage flash memory cell, like a traditional cell, has a gate, a source, and a drain. However, unlike a traditional stacked gate cell in which the source is always connected to an electrical source and the drain is always connected to an electrical drain, respective dual element nitride storage flash memory cells can have the connections of the source and drain reversed during operation to permit the storing of two bits or elements.

In the continued effort to scale down device dimensions and to achieve higher device packing densities, increasingly large memory arrays or groupings are sought-out. Increasing such array sizes may put additional accessing and control duties on the processor or central processing unit (CPU) utilizing these large arrays, particularly where the more complex multi-level and multi-bit memory arrays are used. In addition, ever increasing numbers of peripheral devices also demand attention of the processor to which they are attached. One way that these demands can be off-loaded from the CPU is by utilizing a serial peripheral interface (SPI) to take over such memory access/control and peripheral interfacing duties.

However, such SPI devices typically require a set of instructions to execute commands, such as a "read" command. These instructions can take as long as 32 clock cycles, or longer. Typical SPI applications require a boot-up or steaming of data to the processor as the system is powered up or after a system reset. Thus, the boot-up of a processor that is serially coupled to a serial peripheral interface device may also be delayed by 32 clock cycles, or longer.

In view of the foregoing, a continued need exists for an improved SPI system and method of booting or streaming data from a serial peripheral interface to a processor without the need of a read instruction and the delays associated therewith.

SUMMARY OF THE INVENTION

The following presents a simplified summary of the invention in order to provide a basic understanding of some aspects of the invention. This summary is not an extensive overview of the invention. It is intended neither to identity key or critical elements of the invention nor to delineate the scope of the invention. Rather, its primary purpose is merely to present one or more concepts of the invention in a simplified form as a prelude to the more detailed description that is presented later.

The present invention provides an improved system and method of detecting an auto-boot, mode of a serial peripheral interface (SPI) and serially booting data from the SPI to a processor without the need of a read instruction, thereby avoiding the delays associated with waiting for and processing a read instruction after power-up or a reset command, for example. The improved SPI of the present invention comprises an auto-boot mode detector configured to determine whether a boot mode exists after power-up or a reset condition based on detecting whether serial input data is received during a predetermined wait state, or based on waiting for the predetermined wait state, and configured to selectively boot data to a start address associated with the processor based on the boot mode determination.

In one or more embodiments, a serial peripheral interface system is provided operable to boot data from a serial peripheral interface (SPI) to a processor (CPU) without the need of a read instruction. The system comprises the serial peripheral interface configured to serially communicate data between the processor and at least two peripherals (e.g., a memory, user input or output component, power supply, sensor, or display), and an auto-boot component (e.g., located in a state machine used within or external to the SPI) operably coupled to the serial peripheral interface, having an auto-boot mode detector. The auto-boot mode detector is configured to determine whether an auto-boot mode exists, and is configured to selectively boot data to a start address (e.g., in a start address register) associated with the processor based on the determination.

In addition, the system and method of the present invention is applicable to and reliable for various memory technologies.

In one implementation, the auto-boot mode detector is configured to determine whether the auto-boot mode exists based on the state of an auto-hoot mode bit and detection of a power-up or reset condition, a chip select state, and detecting whether serial input data is received during a predetermined wait state detecting whether serial input data is received during a wait state, or waiting for a timeout of the wait state.

In another implementation, the start address is stored in a start address register, which represents a first memory location of a subsequent plurality of memory locations that receive the boot data.

In still another embodiment, the booting of data stops when the serial peripheral interface is deselected.

In yet another embodiment, at least one of the peripherals comprises a memory that stores the boot data for the processor.

In one embodiment, the memory comprises a multi-bit multi-level flash memory.

The SPI auto-boot system and method may also be suitably implemented in a variety of flash memory architectures including single and dual sided ONO flash EEPROM, and other such single or multi-bit memory architectures that may be electrically programmed, and any such cell or variant is contemplated as falling within the scope of the present invention.

The present invention also provides a method of detecting an SPI auto-boot mode and booting data from a serial peripheral interface to a processor without the need of a read instruction. The method comprises determining whether the SPI auto-boot mode exists, and booting data from a serial peripheral interface to a processor without the need of a read instruction, comprising determining whether the auto-boot mode exists based on detecting whether serial input data is received during a predetermined wait state, or based on waiting for the predetermined wait state, and booting data to a starting address associated with the processor based on the auto-boot mode determination and while the auto-boot mode exists.

In another embodiment, the method further comprises determining whether the auto-boot mode exists based on detecting an auto-boot mode active state and one of a power-up or reset condition, and detecting a chip selected state of the serial peripheral interface.

In still another embodiment, the booting of data stops when the serial peripheral interface is deselected.

In yet another embodiment, the boot data originates in a multi-bit multi-level flash memory.

In another embodiment, the determining whether the auto-boot mode exists is based on detecting that no serial input data is received during the predetermined wait state.

The present invention thereby provides a system and method of using an improved SPI for rapidly booting data between a memory and a processor after power-up or a reset command without the delays of having to wait for and process a read command.

To the accomplishment of the foregoing and related ends, the following description and annexed drawings set forth in detail certain illustrative aspects and implementations of the invention. These are indicative of but a few of the various ways in which one or more aspects of the present invention may be employed. Other aspects, advantages and novel features of the invention will become apparent from the following detailed description of the invention when considered in conjunction with the annexed drawings.

DETAILED DESCRIPTION OF THE INVENTION

Figure 1A:
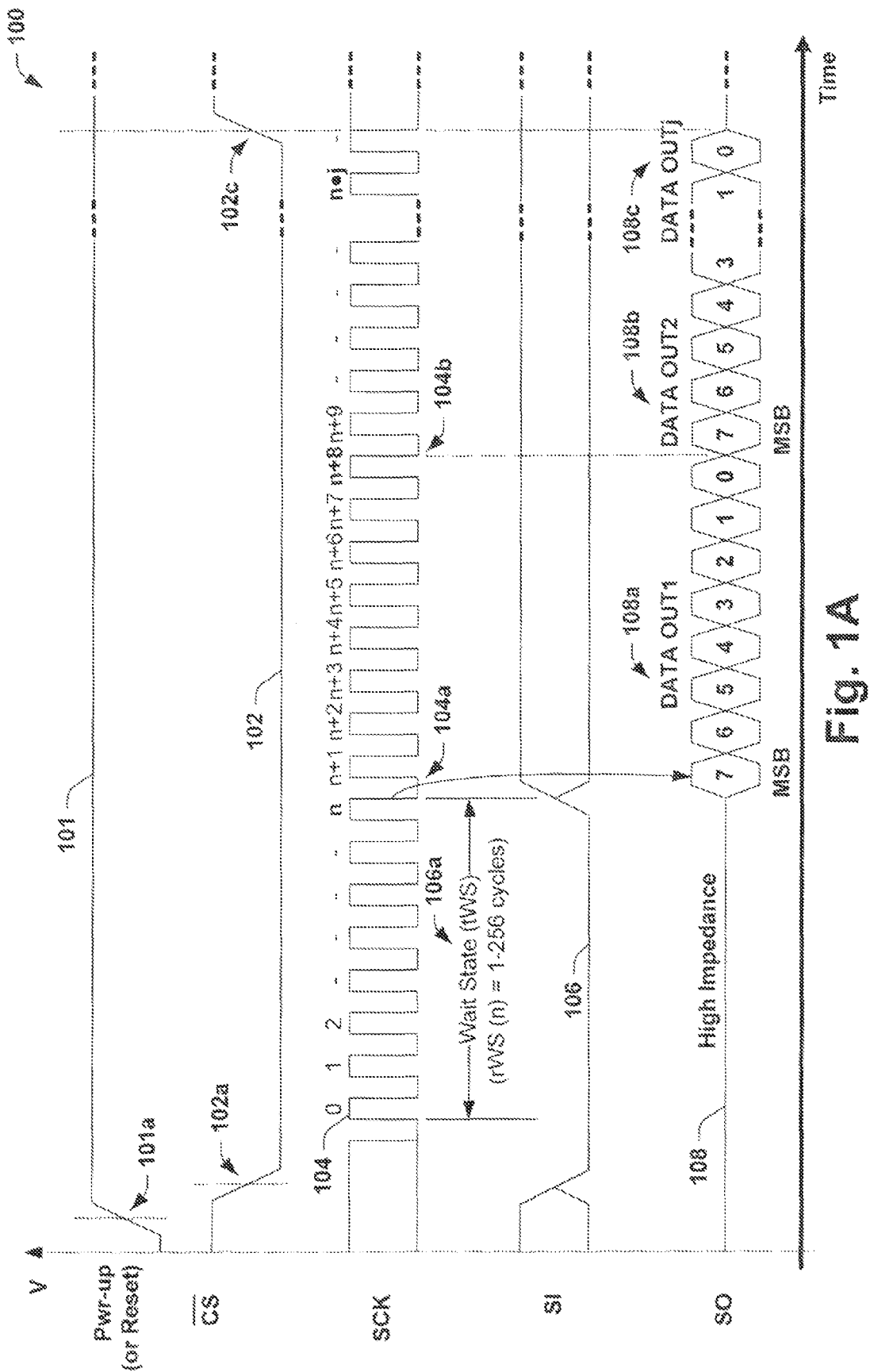
FIGS. 1A and 1B are timing diagrams of exemplary SPI auto-boot mode schemes used by a serial peripheral interface (SPI) to detect the auto-boot mode and to initiate serially booting data to a processor or another suitable device after power-up or a reset command, in accordance with the SPI auto-boot mode methods of the present invention.

One or more aspects of the present invention are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the present invention. It may be evident, however, to one skilled in the art that one or more aspects of the present invention may be practiced with a lesser degree of these specific details. In other instances, well-known structures and devices are shown in block diagram form in order to facilitate describing one or more aspects of the present invention.

As indicated, higher density semiconductor devices and increasing numbers of peripheral devices places more time and attention demands on a processor and the SPI to which the peripherals are attached. Typical SPI applications require a boot-up, wherein data is streamed to the processor as the system is powered up or after a system reset. However, such SPI devices typically require a set of instructions to execute commands, such as a "read" command. These instructions can take as long as 32 clock cycles, or longer. Thus, the boot-up of a processor serially coupled to a serial peripheral interface device may also be delayed by 32 clock cycles, or longer.

The improved SPI system and method of the present invention, provides a means for selectively booting or bursting (continuously streaming) the boot data from a memory array interfaced by the SPI to the processor (e.g., or a DRAM, FPGA, or another suitable device) without the need of a read instruction and the delays associated therewith.

Figure 1B:
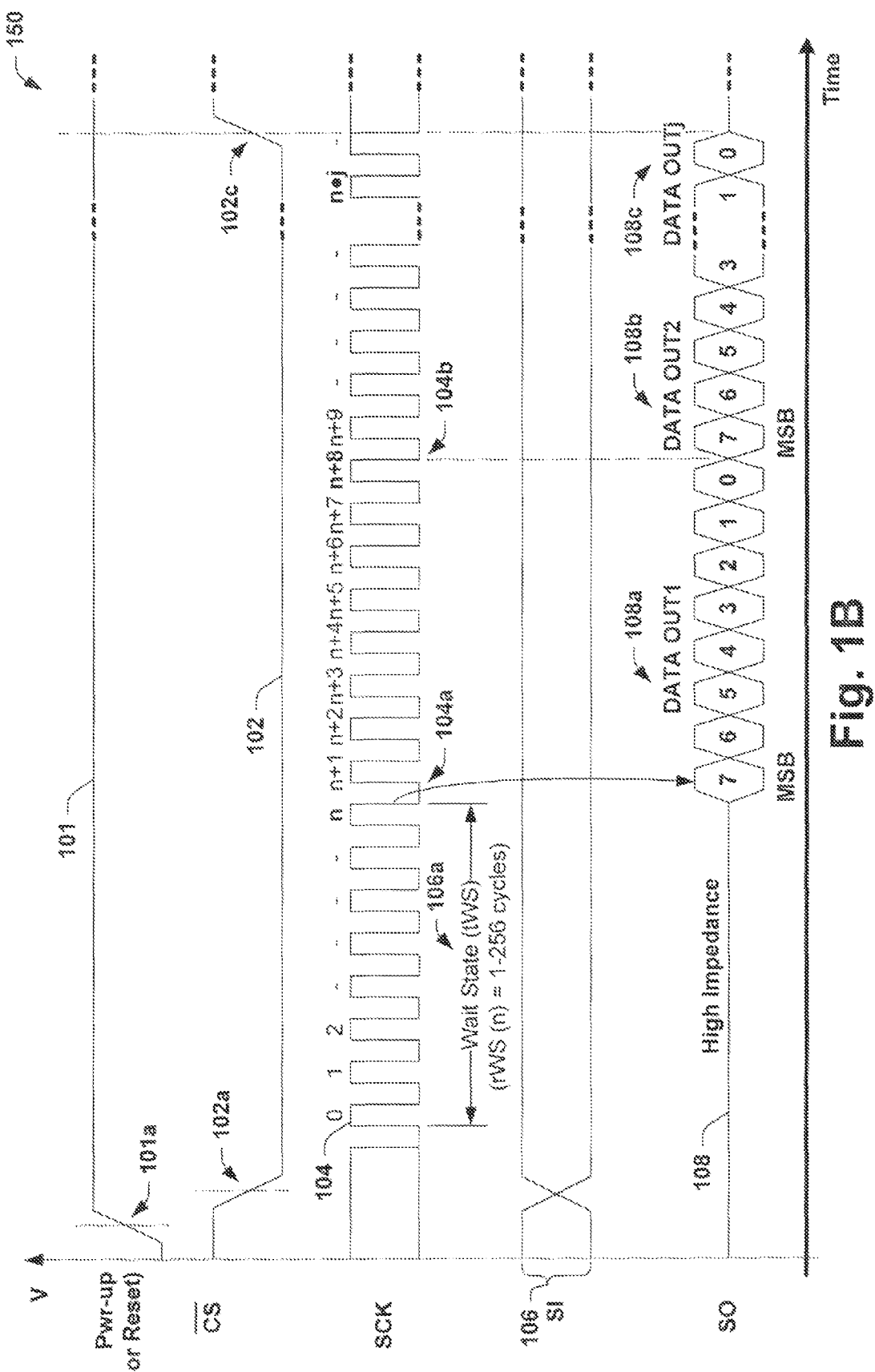

Referring initially to FIGS. 1A and 1B, timing diagrams are presented of exemplary SPI auto-boot mode A 100 and SPI auto-boot mode B 150, respectively, used by a serial peripheral interface (SPI) to detect an auto-boot mode and to initiate serially booting data to a processor (e.g., a DRAM, FPGA, or another suitable device) after power-up or a reset command, in accordance with the present invention.

SPI auto-boot mode A 100 and B 150 differ in their mode detection schemes which may be summarized as follows. SPI auto-boot mode A 100 monitors for serial input data during a wait state or time delay (tWS), then bursts (boots) data to the processor, while SPI auto-boot mode B 150 simply waits for the timeout of wait state or time delay tWS (essentially ignoring the serial input data), then bursts data to the processor, for example.

Both SPI auto-boot mode A 100 and mode B 150 comprise, for example, initially monitoring for a power-up condition or a reset command or signal 101 to be detected at the SPI. After the power-up or a reset signal 101 goes high at 101*a*, for example, the SPI then monitors a chip select input signal CS 102 for a chip selected state 102*a* identified by CS 102 toggling from high to a low level, for example.

Then, in SPI auto-boot mode A 100, after the SPI chip select CS 102 active state is detected at 102*a*, a state machine within the SPI, for example, begins monitoring a serial input (SI) for serial input data SI 106 from the processor for a predetermined number (n) of clock cycles of a serial clock signal SCK 104. After a wait state timing (tWS) 106*a*, defined by the predetermined number of clock cycles (n) stored in a wait state register (rWS), for example, and if no serial input data SI 106 has yet been received, the SPI begins streaming (booting, bursting) data (e.g., DATA OUT1 108*a*, DATA OUT2 108*b*, DATA OUTj 108*c*) via serial output signal SO 108 to the processor.

Alternately, in SPI auto-boot mode B 150, after the SPI chip select CS 102 active state is detected at 102*a*, the state machine within the SPI, for example, essentially ignores the serial input data SI 106 from the processor, and instead simply waits for the timeout of wait state timing tWS 106*a*. Once again, wait state timing tWS 106*a* is defined by the predetermined number of clock cycles (n) stored in a wait state register (rWS). Then the SPI begins streaming (booting, bursting) data (e.g., DATA OUT1 108*a*, DATA OUT2 108*b*, DATA OUTj 108*c*) via serial output signal SO 108 to the processor, for example.

Because this booting of data (e.g., boot data 108) from the SPI can be communicated to the processor without waiting to receive a "read" instruction from the processor, the schemes 100/150 of the present invention may each be referred to herein as an auto-boot mode, auto-boot scheme, or auto-boot mode method, thus avoiding the delays associated with waiting for and processing a read instruction.

In either SPI auto-boot mode A 100 or mode B 150, the serial output data SO 108 is burst to a predefined or pre-programmed starting address (SA). The starting address SA which is programmed into a start address register (rSA), may be associated with the processor, DRAM or an FPGA, for example. The start address SA, for example, may have a factory default address of 0000h, and may be located within a state machine associated with the SPI (e.g., either internal or external to the SPI). The start address SA identifies the first address to receive boot data, for example, from a memory array interfaced by the SPI. Thereafter, the memory contents of the boot data is continuously shifted out on the serial output signal SO 108 during DATA OUT1 timing 108*a*, DATA OUT2 timing 108*b*, continuing through DATA OUTj timing 108*c*, for example, starting with the identified start address SA and starting with MSB bit 7 and serially shifting out each data bit on the falling edge of each serial clock SCK 104 cycle continuing to LSB bit 0 in each 8-bit data byte. It may also be appreciated that the data at each memory location my comprise 16, 32, or 64 bit data, for example.

Although the output data as described above is serially output on serial output signal SO 108, the output data may be burst out serially or otherwise communicated over one or more such communication lines (e.g., four serial output signals and respective outputs following the serial communications protocol of the SPI) to the location(s) specified by the starting address, for example.

Data (e.g., boot data) 108 will continuously burst out serially via serial output signal SO 108 to the processor until the SPI chip is deselected at 102*c* as CS 102 toggles from low to a high state again, at which point the booting of data stops. At any point, when CS 102 is deselected, the SPI device will reset from the auto-boot mode 100 to a standard SPI mode, and will thus be able to accept normal command operations (instructions).

Thereafter, auto-boot modes A 100 or B 150 will not initiate again until another power-up cycle or a reset command is received at the SPI. For a user to select this auto-boot mode, a user accessible auto-boot mode register bit (rABM) may be utilized and set to enable the auto-boot mode. For example, a factory default setting for this auto-boot mode register bit (rABM) may provide that the auto-boot mode is disabled.

As described above, the present SPI auto-boot modes A 100 or B 150 may be accomplished utilizing the systems and methods described in association with the following figures, and may in one or more embodiments utilize one or more aspects of current and legacy SPI hardware.

Figure 2:
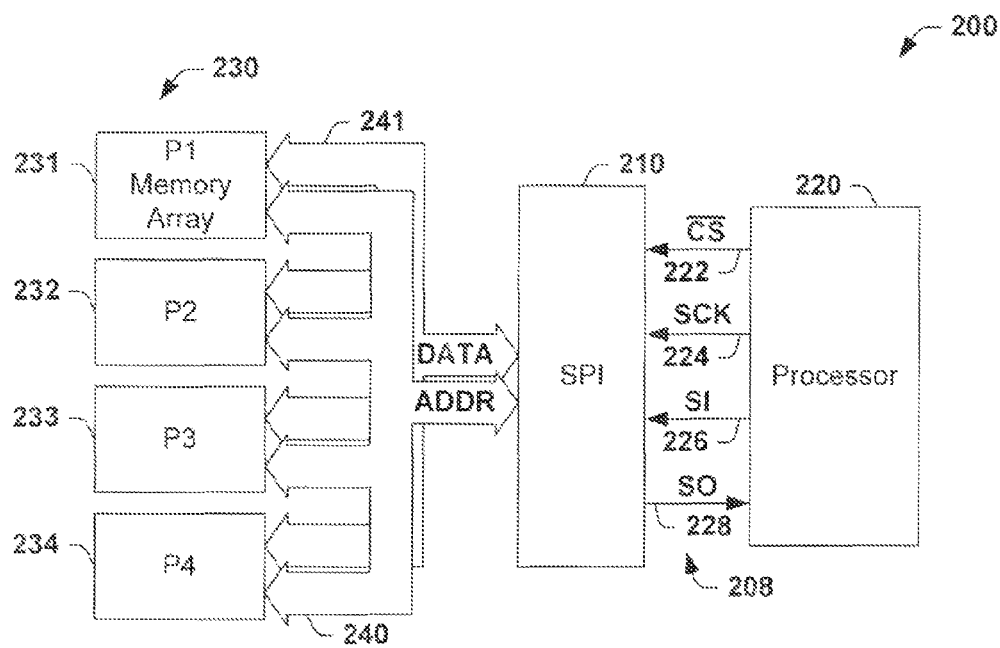
FIGS. 2 and 3 are functional diagrams of an interface system employing an SPI having an auto-boot mode detector and auto-boot mode registers in accordance with an aspect of the present invention using the SPI auto-boot mode schemes of FIGS. 1A and 1B.
Figure 3:
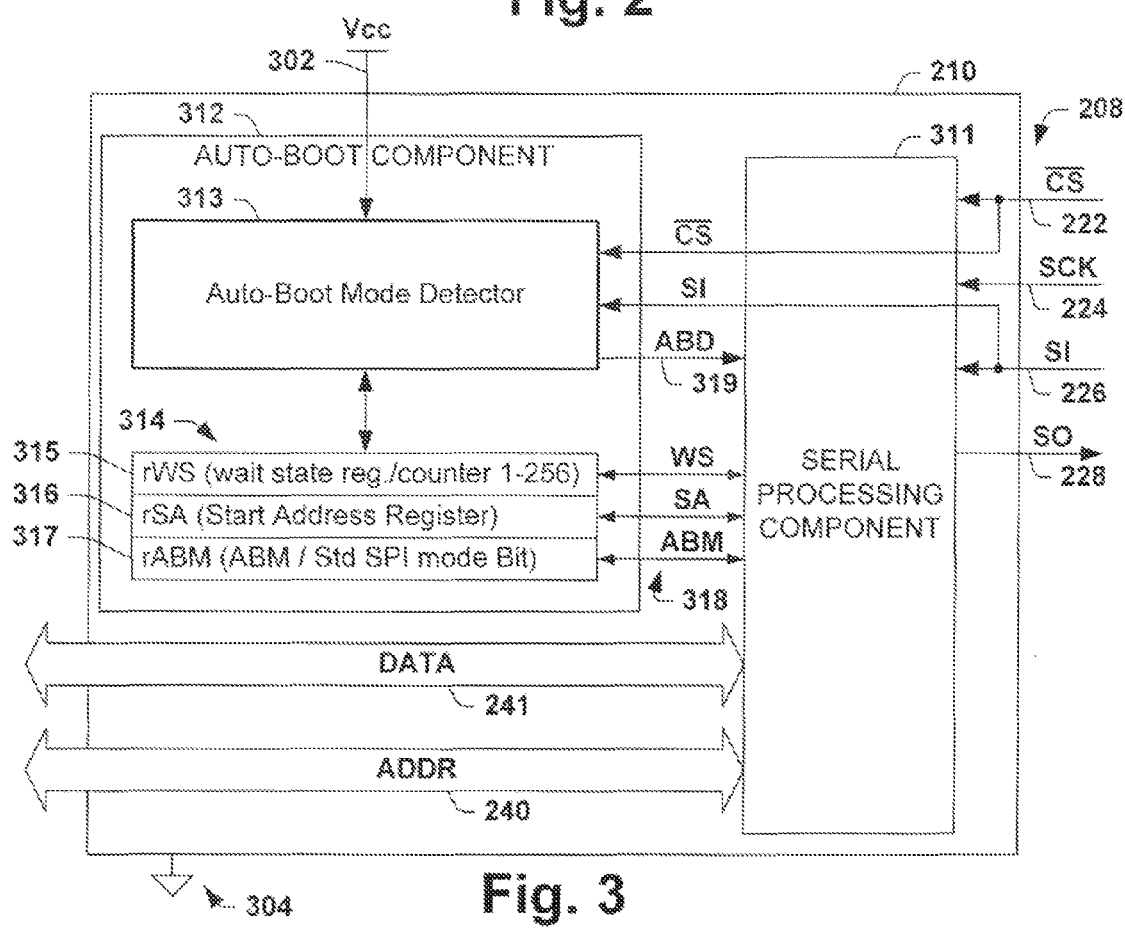

FIGS. 2 and 3 illustrate an exemplary interface system 200 operable to automatically boot data from a serial peripheral interface SPI 210 to a processor CPU 220 without the need of a read instruction, for example, utilizing the SPI auto-boot mode A 100 of FIG. 1A or SPI auto-boot mode B 150 of FIG. 1B in accordance with an aspect of the present invention.

FIG. 2 illustrates an exemplary interface system 200 employing an auto-boot serial peripheral interface SPI 210 configured to serially communicate data between the processor CPU 220 and at least two peripherals 230 (e.g., P1 memory array 231, P2 232, P3 233 and P4 234) such as a memory, a user input or output component, a power supply, a sensor, or a display, which may be interfaced in accordance with an aspect of the present invention. The auto-boot SPI 210 of interface system 200 comprises an auto-boot mode component 312 configured to determine whether a boot mode exists, and configured to selectively boot data to a start address associated with the processor based on the boot mode determination. The boot mode determination, for example, may be either based on detecting whether serial input data is received during a predetermined wait state, or based on simply waiting for the timeout of the predetermined wait state to insure the processor or another such device is ready to receive the boot data.

The interface system 200 may be serially coupled to a processor 220, for example, by a 4-wire serial bus 208, comprising a chip select CS 222, a serial clock SCK 224, a serial input 226, and a serial output 228. The processor CPU 220 and SPI 210 serially communicate opcodes of instructions and addresses for writing to or reading from the memory peripheral P1 231, or serially communicate data between the other peripherals P2-P4 and the processor 220, for example, according to one of the schemes of FIGS. 1A and 1B. The address and data information is communicated between the SPI 210 and the selected peripheral (P1 231-P4 234) over the address bus 240 and the data bus 241. In addition, peripheral select lines (not shown) may also be provided for the SPI 210 to select a peripheral 230 to which the address/data communications are directed.

Although four peripherals 230 (e.g., P1 memory array 231, P2 232, P3 233 and P4 234) are illustrated and described in the present example of FIG. 2, the inventors appreciate that any number of peripherals, for example, N (e.g., 256) peripherals may be utilized and attached to the SPI 210. In addition, any memory size which is addressable by the SPI may be utilized as one or more of the peripherals, to store boot data which will be streamed (booted) to the processor, DRAM, or FPGA, for example, in accordance with the auto-boot modes.

FIG. 3 further illustrates one embodiment of the SPI 210 of the interface system 300, comprising a serial processing component 311 that is configured to serially communicate data between the processor 220 and at least two peripherals 230, operable to handle all the usual serial processing functions of a conventional SPI.

SPI 210 further comprises an auto-boot component 312 (e.g., located in a state machine used within or external to the SPI) operably coupled to the serial processing component 311, comprising an auto-boot mode detector 313 configured to determine whether a boot mode exists. For example, auto-boot mode detector 313 makes this boot mode determination based on detecting whether serial input data SI 106 is received, for example, at serial input SI 226 during a wait state (e.g., wait state timing tWS 106a), or based on waiting for a timeout of the wait state (e.g., wait state timing tWS 106a). In one or more embodiments, the wait state timing tWS 106a may be stored in a wait state register rWS 315 in the auto-boot component 312. Auto-boot mode detector 313 is further configured to selectively boot data (e.g., DATA OUT1 108a-DATA OUTj 108c) to a start address SA, for example, stored in a start address register rSA 316 associated with the processor 220, based on the boot mode determination.

SPI 210 further comprises an auto-boot mode register rABM 317 which stores one of an auto-boot mode state or standard SPI mode state. In this way, the user of the auto-boot mode SPI 210, is thus provided the ability to determine if upon the next power-up or reset command if the SPI 210 is to be utilized in ABM or standard SPI mode.

The wait state register rWS 315, start address register rSA 316, and the auto-boot mode register rABM 317 comprise the ABM state registers 314, which are operably coupled to the auto-boot mode detector 313 of the auto boot component 312. It is appreciated, however, in the context of the present invention, that one or all of the ABM state registers 314 and/or the auto-boot mode detector 313 may be located within, or external to the SPI 210. Register WS, SA, and ABM information 318, for example, the wait state WS of a count of the serial clock cycles SCK 224, the starting address SA, and the auto-boot mode/standard SPI mode ABM, may be programmed into the respective ABM state registers 314 by the user of the auto-boot mode SPI 210 via serial processing component 311, or default values may be programmed into a state machine of the SPI 210.

Operationally, and in one embodiment such as auto-boot mode A of FIG. 1A, the auto-boot component 312 receives a power-up indication, for example, directly or indirectly derived from Vcc 302, the chip select CS 222, and the serial input SI 226, and uses these inputs along with the state of the ABM register bit rABM 317 to make an auto boot mode determination. In another embodiment such as auto-boot mode B of FIG. 1B, the auto-boot component 312 receives a power-up indication, for example, directly or indirectly derived from Vcc 302, the chip select CS 222, and uses these inputs along with the state of the ABM register bit rABM 317 to make an auto boot mode determination. In mode A, if no serial input data is received at SI 226 by the end or timeout of the wait state, the auto-boot mode determination may be made. In mode B, regardless of the serial input data, when the wait state timeout occurs, the auto-boot mode determination may be made.

Whether in mode A or B, the auto-boot mode determination ABD is then output at ABD 319 to initiate the start of a data burst (e.g., DATA OUT1 108a to DATA OUTj 108c) from serial output SO 228 of serial processing component 311, for example, to the start address SA programmed into the start address register rSA 316. For example, this start address SA may be used to point to a location in a cash, RAM, or SRAM of a processor such as processor 220, in an embedded or separate DRAM or FPGA, or another suitable memory device. The data (e.g., boot data 108) is communicated (booted) between a peripheral 230 such as memory peripheral P1 231 via data bus 241 and address bus 240 to SPI 210 which is then serially communicated out over serial output SO 228 to the memory location pointed to by rSA 316 associated with the processor 220, for example, or another suitable memory location.

Although the output data 108 as described above is serially output from serial output SO 228, the output data 108 may be burst out serially or otherwise communicated over one or more such communication lines (e.g., foot serial outputs following the serial commutations protocol of the SPI 210) to the location(s) specified by the start address SA in the start address register rSA 316, for example.

The above described solutions are simple and cost effective since the embodiments of the present invention allows current and legacy based processor devices a method of overcoming the delay times associated with waiting for and processing a read instruction from the processor.

Accordingly, it is another goal of the present invention to provide a method of detecting an SPI auto-boot mode and booting data from a serial peripheral interface to a processor without the need of a read instruction. In particular, the method comprises determining whether the SPI auto-boot mode exists, and booting data from a serial peripheral interface to a processor without the need of a read instruction, comprising determining whether the auto-boot mode exists based on detecting whether serial input data is received during a predetermined wait state, or based on waiting for the predetermined wait state, and booting data to a starting address associated with the processor based on the auto-boot mode determination and while the auto-boot mode exists.

The method of the present invention is suitably implemented in serial peripheral interface devices of the present invention to boot data from memory arrays utilizing any device technologies including Phase change (PCM), Ferroelectric (FeRAM or FRAM), Programmable Metallization Cell (PMC), and any memory architectures including NAND, NOR, ORNAND, SRAM, Flash, and DRAM, as well as single bit, multi-bit and in particular, multi-level bits (MLB) memory devices having any number of levels (e.g., erase and program levels).

Although the methodology is illustrated and described hereinafter as a series of acts or events, it will be appreciated that the present invention is not limited by the illustrated ordering of such acts or events. For example, some acts may occur in different orders and/or concurrently with other acts or events apart from those illustrated and/or described herein.

In addition, not all illustrated steps may be required to implement a methodology in accordance with one or more aspects of the present invention. Further, one or more of the acts may be carried out in one or more separate acts or phases.

Figure 4A:
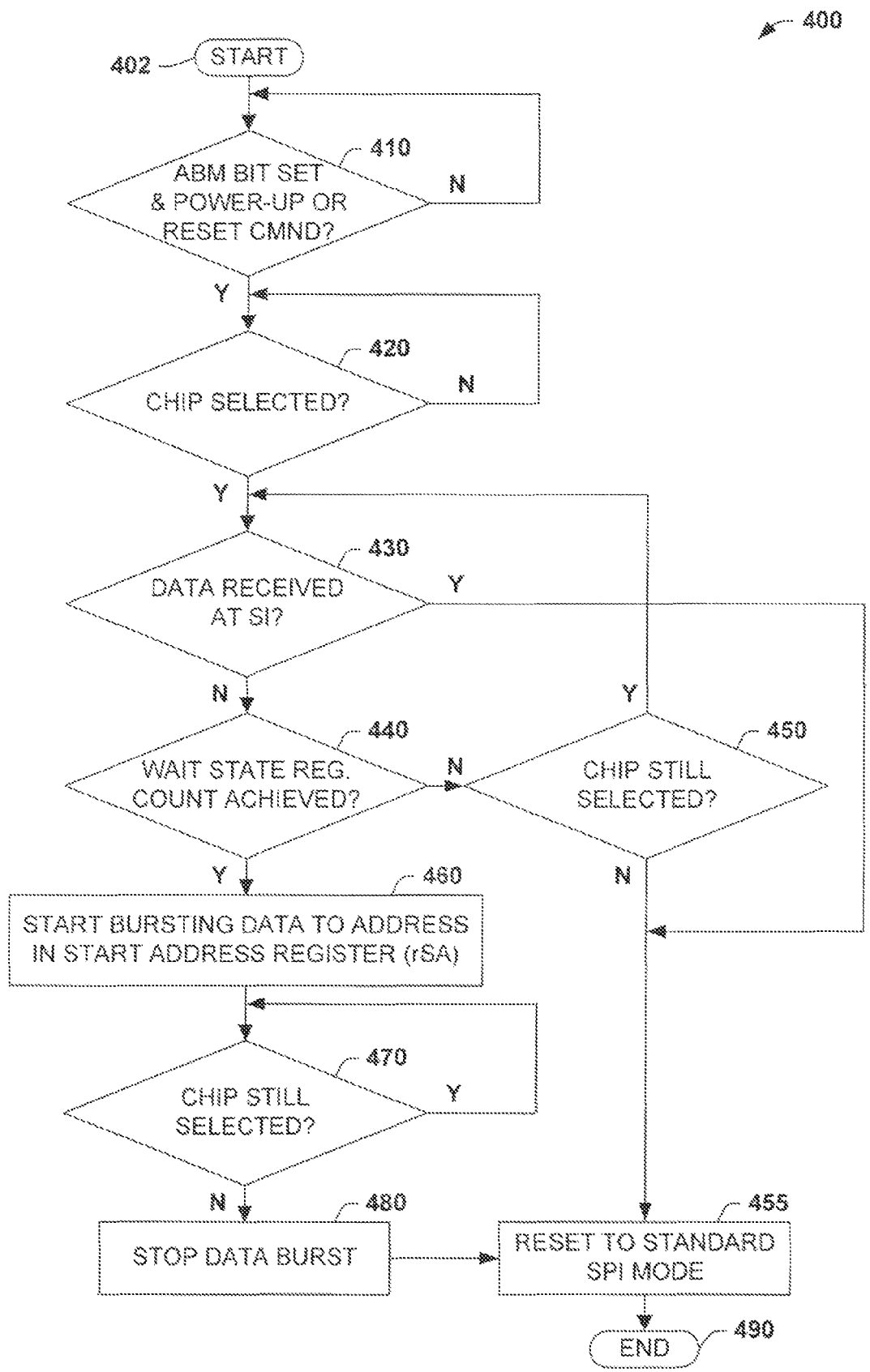
FIGS. 4A and 4B are flow diagrams of exemplary methods of detecting an SPI auto-boot mode and booting data from a memory to a starting address associated with a processor, utilizing the SPI auto-boot system of FIGS. 2 and 3, and the SPI auto-boot mode schemes of FIGS. 1A and 1B, according to the SPI auto-boot mode methods of the present invention.
Figure 4B:
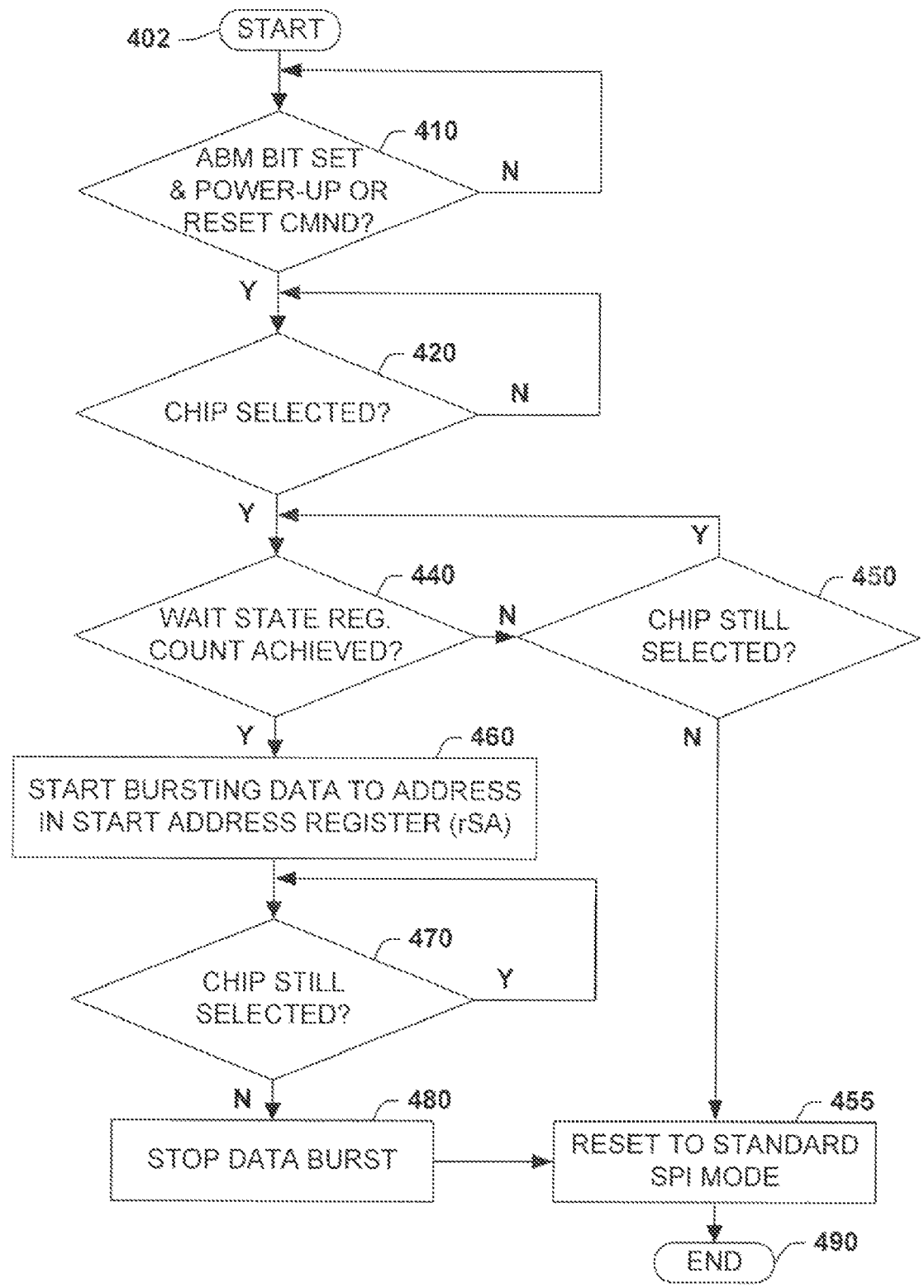

FIGS. 4A and 4B illustrate exemplary methods 400 and 495 of detecting an SPI auto-boot mode condition and thereafter booting data from a memory to a starting address associated with a processor, for example, utilizing the SPI auto-boot system of FIGS. 2 and 3, according to the SPI auto-boot mode scheme 100 of FIG. 1A and scheme 150 of FIG. 1B of the present invention.

Assume for the sake of the following method discussion, a system interface similar to the system interface 200 of FIGS. 2 and 3 comprising an SPI 210 serially coupled to a processor 220 and at least two peripherals 230 (e.g., 231-234) comprising at least one memory array 231 coupled to the SPI 210, and wherein the SPI 210 further comprises a serial processing component 311 configured to serially communicate data between the processor 220 and the at least two peripherals 230, and an auto-boot component 312 operably coupled to the serial processing component 311. The auto-boot mode component 312 further comprises an auto-boot mode detector 313 configured to determine whether a boot mode exists based on detecting whether serial input data (e.g., SI 106) has been received during a wait state (e.g., tWS 106a), or waiting for the wait state (e.g., tWS 106a), and configured (e.g., via ABD 319) to selectively boot data (e.g., SO 108) to a start address (SA) associated with the processor 220 based on the boot mode determination (e.g., ABD 319).

While the term "memory" or "array" is used throughout, it should be understood that such terms are not to be construed as limiting to one specified memory grouping size of cells or bits, but rather may apply to any grouping of memory cells, and MLB cells including single or multi-bit cells.

Initially, before SPI auto-boot method A 400 of FIG. 4, according to the SPI auto-boot mode A of FIG. 1A, or SPI auto-boot method B 400 of FIG. 4, according to the SPI auto-boot mode B of FIG. 1B starts at 402, the ABM mode bit (e.g., rABM 317) may be preset by the user to a high, for example, to indicate the ABM mode, or may be reset to a low, for example, to indicate the standard SPI mode. Also, the wait state register rWS 315 may be preset or programmed to a predetermined count, for example, to a count of 8 representing the a wait state or time delay produced by 8 clock cycles SCK 104. Finally, the starting address SA may also be programmed in starting address register rSA 316, for example, to point to the first address location that boot data will be burst out to.

Method 400 (mode A) then begins at 402 and includes initially determining at 410 whether the ABM mode bit (e.g., rABM 317) is set (e.g., indicating the ABM mode) or is in the standard SPI mode, and whether a power-up mode (e.g., by monitoring Vcc 302 for a high level) or a "reset command" has been received. If one of these two initial ABM mode conditions has been received, method 400 proceeds to 420, otherwise the ABM mode monitoring repeats to 410.

At 420 a determination is made as to whether the chip has been selected (e.g., by monitoring CS 222 for a low level). If the SPI chip select CS 222 is "active", method 400 proceeds to 425, otherwise the chip select monitoring repeats to 420.

At 430 a determination is made as to whether data (e.g., SI 106 of FIG. 1A) has been received, for example, by monitoring SI 226 of FIGS. 2 and 3. If data SI 106 has been received at SI 226, for example, method 400 proceeds to 455 where the mode is reset to the standard SPI mode and the method 400 ends at 490, otherwise the method 495 advances to 440 (e.g., if SI 226 maintains a constant low as illustrated by SI 106 of FIG. 1A).

At 440 a determination is made as to whether the wait state count (e.g., 8) of the wait stage register rWS 315 (representing the wait state timing tWS 106a) has been achieved, for example, according to the SCK 224 clock cycles. If tWS 106a has timed out (the count has been achieved) at 440, method 400 advances to 460 for data booting, otherwise if tWS is not timed out, the method proceeds to 450 for another chip select determination.

At 450 another chip select determination is made as to whether the chip has been selected (e.g., by monitoring to insure CS 222 is still at a low level). If the SPI chip select CS 222 is still, "active", method 400 proceeds again to 430 for additional data input monitoring until tWS times out at 440, otherwise, if the chip select CS 222 is found to be no longer active at 450, the mode is reset to the standard SPI mode at 455 and the method 400 ends at 490.

At 460 data is burst out to the starting address SA memory location specified in the starting address register rSA 316.

At 470 a final chip select determination is made while data is being burst out to the starting address SA (e.g., by monitoring CS 222 for a low level). If the SPI chip select CS 222 is still "active", method 400 continuously bursts data and proceeds back again to 470 until the chip select CS 222 is found to be deselected or inactive (e.g., CS returns to a high) at 470 and the method 400 advances to 480.

Thereafter, with SPI 210 deselected, data bursting is stopped at 480, and the mode is reset to the standard SPI mode at 455 and the method 400 ends at 490.

Similarly, method 495 (mode B) begins at 402 and includes initially determining at 410 whether the ABM mode bit (e.g., rABM 317) is set (e.g., indicating the ABM mode) or is in the standard SPI mode, and whether a power-up mode (e.g., by monitoring Vcc 302 for a high level) or a "reset command" has been received. If one of these two initial ABM mode conditions has been received, method 495 proceeds to 420, otherwise the ABM mode monitoring repeats at 410.

At 420 a determination is made as to whether the chip has been selected (e.g., by monitoring CS 222 for a low level). If the SPI chip select CS 222 is "active", method 495 proceeds to 425, otherwise the chip select monitoring repeats to 420.

At 440 a determination is made as to whether the wait state count (e.g., 8) of the wait stage register rWS 315 (representing the wait state timing tWS 106a) has been achieved, for example, according to the SCK 224 clock cycles. If tWS 106a has timed out (the count has been achieved) at 440, method 495 advances to 460 for data booting, otherwise if tWS is not timed out, the method 495 proceeds to 450 for another chip select determination.

At 450 another chip select determination is made as to whether the chip has been selected (e.g., by monitoring to insure CS 222 is still at a low level). If the SPI chip select CS 222 is still "active", method 495 proceeds again to 430 for additional data input monitoring until tWS times out at 440, otherwise, if the chip select CS 222 is found to be no longer active at 450, the mode is reset to the standard SPI mode at 455 and the method 495 ends at 490.

At 460 data is burst out to the starting address SA memory location specified in the starting address register rSA 316.

At 470 a final chip select determination is made while data is being burst out to the starting address SA (e.g., by monitoring CS 222 for a low level). If the SPI chip select CS 222 is still "active", method 495 continuously bursts data and proceeds back again to 470 until the chip select CS 222 is found to be deselected or inactive (e.g., CS returns to a high) at 470 and the method 495 advances to 480.

Thereafter, with SPI 210 deselected, data bursting is stopped at 480, and the mode is reset to the standard SPI mode at 455 and the method 495 ends at 490.

Figure 5:
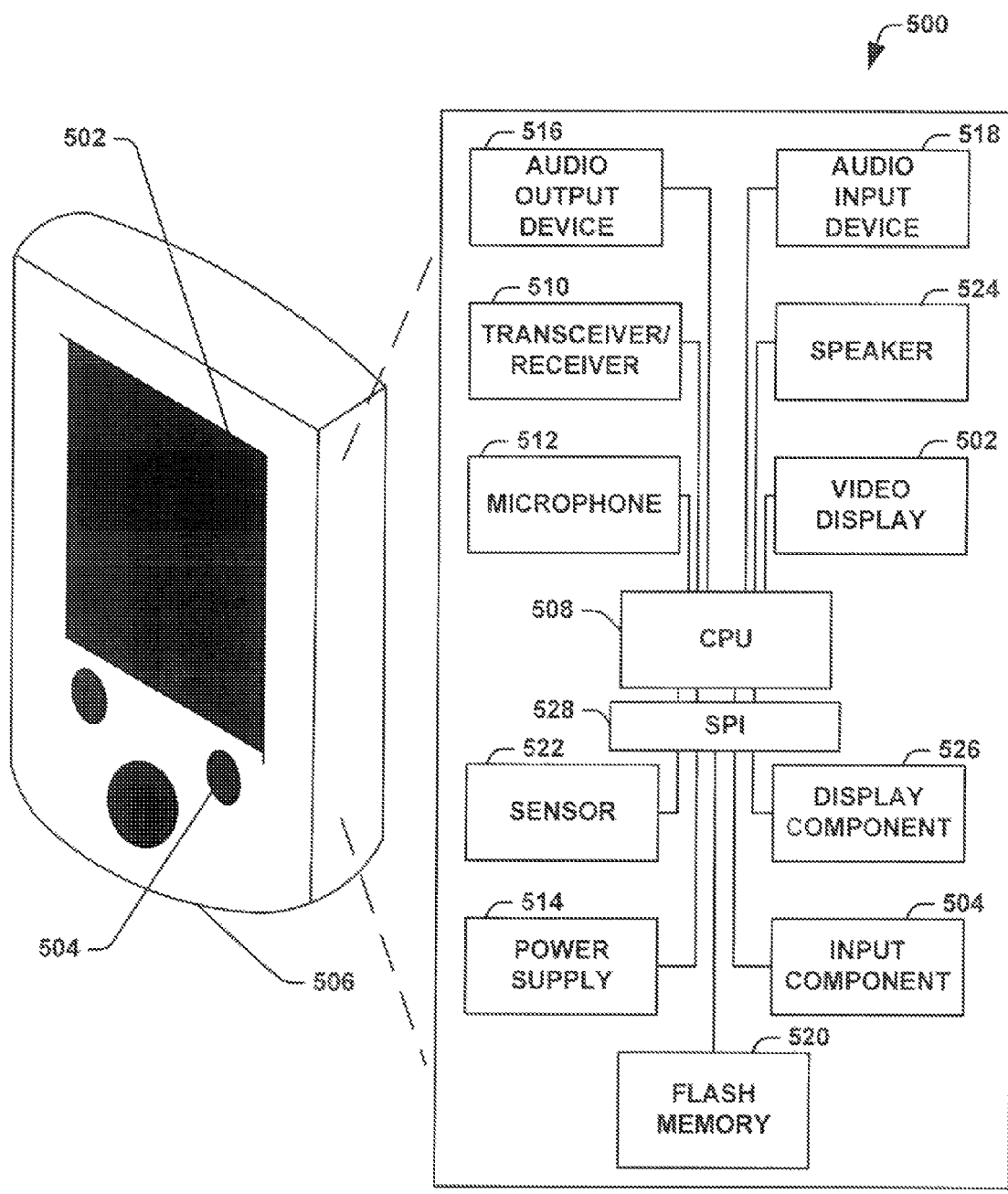
FIG. 5 is an isometric view of an electronic device and block diagram, wherein an SPI device may be utilized for interfacing with, communicating data between multiple peripheral devices and a central processing unit (CPU), and detecting an auto-boot mode and serially booting data to the CPU after power-up or a reset command according to other aspects of the present invention.

FIG. 5 illustrates an exemplary (portable) electronic device, such as a communications device or Personal Data Assistant (PDA) 500, for example, wherein one or more aspects of the disclosure herein may be implemented, and wherein an SPI device having an auto-boot mode detector and several ABM state registers may be utilized for detecting an SPI auto-boot mode and booting data from the SPI to a starting address associated with a processor, according to other aspects of the present invention. The communication device 500 comprises a video display 502, one or more user input components 504, a housing 506, a CPU 508, a transceiver and/or receiver 510, a microphone 512, a power supply 514, an audio output device 516, an audio input 518, a flash memory 520, various sensors 522, speaker(s) 524, a display component 526, and a serial peripheral interface SPI 528. The serial peripheral interface SPI 528 of the communication device 500 may be used, for example, to serially interface (communicate) between the CPU 508 and the user input components 504, the power supply 514, the flash memory 520, the various sensors 522, and the display component 526.

The serial peripheral interface SPI 528 may comprise, for example, a serial processing component configured to serially communicate data between the processor 508 and at least two peripherals (e.g., flash memory 520, input component 504, power supply 514, sensor 522, or display component 526). The SPI 528 also comprises an auto-boot component operably coupled to the serial processing component, comprising an auto-boot mode detector configured to determine whether a boot mode exists, for example, following a power-up condition or after a reset. Alter identifying either a power-up or a reset condition, and based on detecting whether serial input data is received front the processor 508 during a wait state, or simply waiting for the wait state to timeout, the SPI 528 is configured to selectively boot data (e.g., from flash memory 520) to a start address SA associated with the processor 508 based on the boot mode determination.

Thereafter, and based on the inputs of the input component 504, the sensors 522, or the status of the power supply 514, and data stored in the memory 520, for example, die display component 526 can display a graph, a photo, a map, a chart, a video, and the like.

The communication device 500 can also be configured to output data as an audio signal, for example a song, a message, a warning sound, various tones, recordings, etc. The communication device 500 can be configured to communicate with other electronic devices, for example computers, cell phones, other PDAs, and the like. The communication device 500 can also be configured to (wirelessly) transmit and/or receive data written to or read from the flash memory 520. This is done utilizing the transmitter/receiver 510 to either transmit or receive data. Additionally, sensors 522 can be utilized to sense data external to the PDA 500, for example, temperatures, radiation levels, pressures, and the like. It will be appreciated that serial processor interface comprising a plurality of peripheral devices as described herein can similarly be implemented in cell phones, laptops, computers, memory sticks, flash drive devices, video camcorders, voice recorders, USB flash drives, fax machines, flash memory laptops, MP3 players, digital cameras, home video game consoles, hard drives, memory cards (used as solid-state disks in laptops), and the like.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In particular regard to the various functions performed by the above described components (assemblies, devices, circuits, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A serial peripheral interface system operable to boot data from a serial peripheral interface to a processor without the need of a read instruction, comprising:
   the serial peripheral interface configured to serially communicate data between the processor and at least two peripherals; and
   an auto-boot component operably coupled to the serial peripheral interface, comprising an auto-boot mode detector configured to determine whether an auto-boot mode exists, and configured to selectively boot data to a start address associated with the processor based on the determination, wherein the auto-boot mode detector is further configured to determine whether the auto-boot mode exists based on:
   a state of an auto-boot mode bit and detection of a power-up or reset condition,
   a chip select state, and
   detecting whether serial input data is received during a wait state, or whether a timeout of the wait state has occurred.

2. The system of claim 1, wherein the start address is stored in a start address register, which represents a first memory location of a subsequent plurality of memory locations that receive the boot data.

3. The system of claim 1, wherein the booting of data stops when the serial peripheral interface is deselected.

4. The system of claim 1, wherein at least one of the peripherals comprises a memory that stores the boot data for the processor.

5. The system of claim 4, wherein the memory comprises a multi-bit multi-level flash memory.

6. A serial peripheral interface operable to boot data from the serial peripheral interface to a processor without the need of a read instruction, comprising:
   a serial processing component configured to serially communicate data between the processor and at least two peripherals; and
   an auto-boot component operably coupled to the serial processing component, comprising an auto-boot mode detector configured to determine whether a boot mode exists based on detecting whether serial input data is received during a wait state, or based on a timeout of the wait state, and configured to selectively boot data to a start address associated with the processor based on the boot mode determination.

7. The interface of claim 6, wherein the auto-boot mode detector is further configured to determine whether the auto-boot mode exists based on
   a state of an auto-boot mode bit and detection of a power-up or a reset condition, and
   a chip select state.

8. The interface of claim 6, wherein the serial peripheral interface is configured to serially communicate the boot data to the start address associated with the processor utilizing two or more serial outputs.

9. The interface of claim 6, wherein the booting of data to the start address associated with the processor stops when the serial peripheral interface is deselected.

10. The interface of claim 6, wherein at least one of the peripherals comprises a memory that stores the boot data for the processor.

11. The interface of claim 10, wherein the memory comprises a multi-bit multi-level flash memory.

12. A method of detecting a serial peripheral interface (SPI) auto-boot mode and booting data from a serial peripheral interface to a processor without the need of a read instruction, comprising:
    determining whether the auto-boot mode exists based on detecting whether serial input data is received during a predetermined wait state, or based on a timeout of the predetermined wait state; and
    booting data to a starting address associated with the processor based on the auto-boot mode determination and while the auto-boot mode exists.

13. The method of claim 12, further comprising:
    determining whether the auto-boot mode exists based on
    detecting an auto-boot mode active state and one of a power-up or reset condition, and
    detecting a chip selected state of the serial peripheral interface.

14. The method of claim 12, wherein the booting of data stops when the serial peripheral interface is deselected.

15. The method of claim 12, wherein the boot data originates in a multi-bit multi-level flash memory.

16. The method of claim 12, wherein the determining whether the auto-boot mode exists is based on detecting that no serial input data is received during the predetermined wait state, or based on waiting for the predetermined wait state to timeout.

17. An electronic device, comprising:
    a user input configured to allow a user to input data;
    a user output configured to output data to a user;
    a memory configured to store and retrieve data;
    a central processing unit (CPU) configured to receive and process the user input and to output the user output, and to store data in and retrieve data from the memory; and
    a serial peripheral interface (SPI) operatively coupled to the user input, the user output and the memory, and configured to serially communicate data between the CPU and the user input, the user output and the memory, wherein the SPI is configured to boot data from the serial peripheral interface to the central processing unit upon detecting an SPI auto-boot mode without the need of a read instruction, wherein the serial peripheral interface (SPI) comprises:
      a serial processing component configured to serially communicate data between the processor and at least two peripherals, at least one of the peripherals comprising a memory; and
      an auto-boot component operably coupled to the serial processing component, comprising an auto-boot mode detector configured to determine whether a boot mode exists based on detecting whether serial input data is received during a predetermined wait state, or based on a timeout of the predetermined wait state, and configured to selectively boot data to a start address associated with the processor based on the boot mode determination.

18. The device of claim 17, the electronic device comprising at least one of a communication device, Personal Data Assistant (PDA), cell phone, memory stick, flash drive device, video camcorder, voice recorder, USB flash drive, fax machine, flash memory, laptop, computer, scanner, MP3 player, digital camera, home video game console, hard drive and memory card.

* * * * *